United States Patent
Aher et al.

(10) Patent No.: US 11,837,221 B2
(45) Date of Patent: Dec. 5, 2023

(54) AGE-SENSITIVE AUTOMATIC SPEECH RECOGNITION

(71) Applicant: Rovi Guides, Inc., San Jose, CA (US)

(72) Inventors: Ankur Anil Aher, Maharashtra (IN); Jeffry Copps Robert Jose, Tamil Nadu (IN)

(73) Assignee: Rovi Guides, Inc., San Jose, CA (US)

(*) Notice: Subject to any disclaimer, the term of this patent is extended or adjusted under 35 U.S.C. 154(b) by 154 days.

(21) Appl. No.: 17/187,041

(22) Filed: Feb. 26, 2021

(65) Prior Publication Data

US 2022/0277738 A1    Sep. 1, 2022

(51) Int. Cl.
*G10L 15/18* (2013.01)
*G06F 16/438* (2019.01)
(Continued)

(52) U.S. Cl.
CPC ........ *G10L 15/1815* (2013.01); *G06F 16/438* (2019.01); *G06F 40/166* (2020.01);
(Continued)

(58) Field of Classification Search
CPC .............. G10L 15/1815; G10L 15/063; G10L 15/1822; G10L 15/187; G10L 15/22; G06F 16/438; G06F 40/166; G06F 16/243; G06F 16/24522; G06F 16/2457; G06F 16/24575; G06F 16/3329; G06F 16/3344;
(Continued)

(56) References Cited

U.S. PATENT DOCUMENTS 11,348,601 B1 *   5/2022   Deshpande ............. G06F 40/30
2010/0066684 A1   3/2010   Shahraray et al.
(Continued)

FOREIGN PATENT DOCUMENTS

KR       20130009754 A  *  1/2013

OTHER PUBLICATIONS

* R. Voleti, J. M. Liss and V. Berisha, "Investigating the Effects of Word Substitution Errors on Sentence Embeddings," ICASSP 2019—2019 IEEE International Conference on Acoustics, Speech and Signal Processing (ICASSP), 2019, pp. 7315-7319, doi: 10.1109/ICASSP.2019.8683367 (Year: 2019).*

(Continued)

*Primary Examiner* — Pierre Louis Desir
*Assistant Examiner* — Keisha Y. Castillo-Torres
(74) *Attorney, Agent, or Firm* — Haley Guiliano LLP

(57) ABSTRACT

Systems and methods are described to receive a query from a user and provide a reply that is appropriate for an age group of the user. A query for a media asset is received, where such query comprises an inputted term, and the query is determined to be received from a user belonging to a first age group. A context of the inputted term within the query is identified, and in response to the determining, based on the identified context, that the inputted term of the query is inappropriate for the first age group, a replacement term for the inputted term that is related to the inputted term and is appropriate for the first age group in the context of the query is identified. The query is modified to replace the inputted term with the identified replacement term, and a reply to the modified query is generated for output.

16 Claims, 9 Drawing Sheets

(51) Int. Cl.
  *G06N 20/00* (2019.01)
  *G06F 40/166* (2020.01)
  *G10L 15/06* (2013.01)
  *G10L 15/187* (2013.01)
  *G10L 15/22* (2006.01)

(52) U.S. Cl.
  CPC ............ *G06N 20/00* (2019.01); *G10L 15/063* (2013.01); *G10L 15/187* (2013.01); *G10L 15/1822* (2013.01); *G10L 15/22* (2013.01)

(58) Field of Classification Search
  CPC ............ G06F 16/433; G06F 16/90332; G06F 16/9035; G06F 16/9538; G06F 40/30; G06F 16/435; G06N 20/00; G06N 3/0445; G06N 3/0454; G06N 5/02; G06N 3/08
  See application file for complete search history.

(56) References Cited

U.S. PATENT DOCUMENTS

| | | | |
|---|---|---|---|
| 2016/0057497 A1 | 2/2016 | Kim et al. | |
| 2016/0155437 A1* | 6/2016 | Kanevsky | G09B 5/04 704/254 |
| 2016/0180730 A1* | 6/2016 | Lee | G09B 19/06 434/157 |
| 2017/0161772 A1 | 6/2017 | Xu et al. | |
| 2019/0325864 A1* | 10/2019 | Anders | G06F 40/56 |
| 2020/0143808 A1 | 5/2020 | Hwang et al. | |
| 2020/0183773 A1 | 6/2020 | Brehm | |
| 2020/0342859 A1 | 10/2020 | Aher et al. | |
| 2020/0372918 A1* | 11/2020 | Padawer | G10L 15/1822 |

OTHER PUBLICATIONS

Authot, "Phoneme detection, a key step in speech recognition", (Nov. 22, 2017), Retrieved from the Internet: URL:https://www.authot.com/en/2017/11/22/phoneme-detection-speech-recognition/ [retrieved on Apr. 4, 2022].

Waller et al., "Vocal Age Disguise: The Role of Fundamental Frequency and Speech Rate and Its Perceived Effects", Frontiers in Psychology, vol. 7, (Nov. 21, 2016) URL:https://www.frontiersin.org/articles/10.3389/fpsyg.2016.01814/full.

International Search Report and Written Opinion dated Apr. 13, 2022 in connection with PCT/US2021/064405.

Quoc Le, "Distributed Representations of Sentences and Documents," In Proceedings of the 31st International Conference on Machine Learning, PMLR 32(2):1188-1196 (2014).

Tomas Mikolov, Efficient Estimation of Word Representations in Vector Space, ICLR Workshop (2013).

Peters et al., Deep contextualized word representations (2018) cite arxiv:1802.05365, Comment: NAACL 2018. Originally posted to open review Oct. 27, 2017.

Devlin et al., BERT: Pre-training of Deep Bidirectional Transformers for Language Understanding, In Proceedings of NAACL-HLT, pp. 4171-4186 (2019).

* cited by examiner

AGE-SENSITIVE AUTOMATIC SPEECH RECOGNITION

BACKGROUND

This disclosure is directed to receiving a query from a user and providing a reply that is appropriate for an age group of the user. Specifically, techniques are disclosed for modifying a term in a received query with a replacement term based on a determination the term in the context of the query is inappropriate for a particular age group of the user.

SUMMARY

Many users have become accustomed to using search tools (e.g., navigation tools, voice-based queries, text-based queries, etc.) to locate desirable media content. In addition, many users (e.g., parents) may desire to restrict the type of content that other users (e.g., children) can access. In one approach, parents may set up a special profile for their child, which blocks the child from accessing inappropriate content, i.e., if a child user performs a search for media content that includes a term that is deemed inappropriate for children, the child is not provided with any media content for that particular search.

However, such approach has multiple deficiencies. In particular, such approach may be overly restrictive in that it fails to take into account the fact that children tend to have a more limited or distinct vocabulary as compared to adults, i.e., a child may use a term differently than an adult typically uses the term. For example, in the above-mentioned child-friendly profile approach, the child may attempt a search for "violent movies," which may be flagged as inappropriate, resulting in zero results being returned or no search being performed. However, by such "violent movies" query the child may have actually intended to view a superhero cartoon that is, in fact, appropriate for the child's age group, as opposed to a violent movie with an "R" rating (e.g., what an adult might normally regard as being a violent movie). Thus, returning zero results in reply to the query may be frustrating and detract from the user's experience.

Moreover, the aforementioned approach may have other deficiencies, particularly in the case of receiving a voice-based query. For example, young children tend to struggle with pronunciation and clear articulation of various words, which may complicate the task of recognizing and processing a child's speech as the child intended. This may lead to returning media assets that the child is not interested in accessing, or returning no media assets results at all.

In addition, in some circumstances, a system operator may provide access to various media applications, each having their own search tools and/or discrete parental ratings settings. Such an arrangement may be problematic for the system operator in that it may be difficult or not possible to control the content that users can access on such media applications.

To overcome these problems, systems and methods are provided herein for receiving a query for a media asset, where the query comprises an inputted term; determining that the query was received from a user belonging to a first age group; identifying a context of the inputted term within the query; determining, based on the identified context, whether the inputted term of the query is inappropriate for the first age group; in response to the determining that the inputted term of the query is inappropriate for the first age group: identifying a replacement term for the inputted term that (a) is related to the inputted term and (b) is appropriate for the first age group in the context of the query; modifying the query to replace the inputted term with the identified replacement term; and generating for output a reply to the modified query.

Such aspects enable a query received from users of a certain age group (e.g., young children under a certain age) to be modified to more appropriately reflect what such user likely intended by the query, while at the same time ensuring that potentially objectionable or inappropriate content is not provided to the user. In addition, such aspects enable the user associated with the query to be identified (e.g., based on detections by one or more sensors in the vicinity of the user) to confirm the user belongs to a certain age group. Further, such aspects provide system operators, e.g., a multiple-system operator (MSO), more control over what content is provided to users (e.g., by way of media applications provided via the system operator).

In some embodiments, the query is a voice query, and a media application transcribes the voice query to text, and modifies the query by modifying the transcribed text of the query, by replacing the inputted term with the replacement term.

In some aspects of this disclosure, the media application trains a machine learning model to accept as input a first query belonging to the first age group and a context of the first query and output a first replacement term. Such first query comprises a term that is inappropriate for the first age group within the context of the query, and the replacement term is identified by inputting the query and the context of the query into the trained machine learning model. The replacement term output by the machine learning model may be semantically similar to, or phonetically similar to, the inputted term. In some embodiments, a knowledge graph may be employed (e.g., replacement term may be selected based on its proximity in the knowledge graph to the term that is to be replaced).

In some embodiments, the media application may train a first machine learning model to accept as input a first query belonging to the first age group and a context of a term within the first query and output a first replacement term, where the term within the first query is inappropriate for the first age group within the context of the first query. The media application may additionally train a second machine learning model to accept as input the first query and the context of the term within the first query, and output a second replacement term. In identifying the replacement term for the inputted term, the media application may input the query and the context of the inputted term within the context of the query into each of the first machine learning model and the second machine learning model to output a first replacement term semantically similar to the inputted term and a second replacement term phonetically similar to the inputted term from the first machine learning model and the second machine learning model, respectively. The media application may compare a confidence score of the first replacement term to a confidence score of the second replacement term, and identify the replacement term as the first replacement term or the second replacement term based on the comparing. In some embodiments, a knowledge graph may be employed (e.g., replacement term may be selected based on its proximity in the knowledge graph to the term that is to be replaced).

In some aspects of this disclosure, the media application determines whether the inputted term of the query is inappropriate for the first age group by parsing each respective term of the query and marking each respective term as either appropriate for the age group or inappropriate for the first age group.

In some embodiments, the media application determines the inputted term of the query is inappropriate for the first age group by determining that the inputted term matches a term in a list of terms marked as inappropriate for the first age group in the identified context. The list of terms marked as inappropriate for the first age group in the identified context may comprise a list of commonly misused terms by users in the first age group in the identified context, and/or a list of commonly mispronounced terms by users in the first age group in the identified context.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

As referred to herein, the term "media asset" should be understood to refer to an electronically consumable user asset, e.g., television programming, as well as pay-per-view programs, on-demand programs (as in video-on-demand (VOD) systems), Internet content (e.g., streaming content, downloadable content, webcasts, etc.), video clips, audio, playlists, websites, articles, electronic books, blogs, social media, applications, games, and/or any other media or multimedia, and/or combination of the above.

Figure 1:
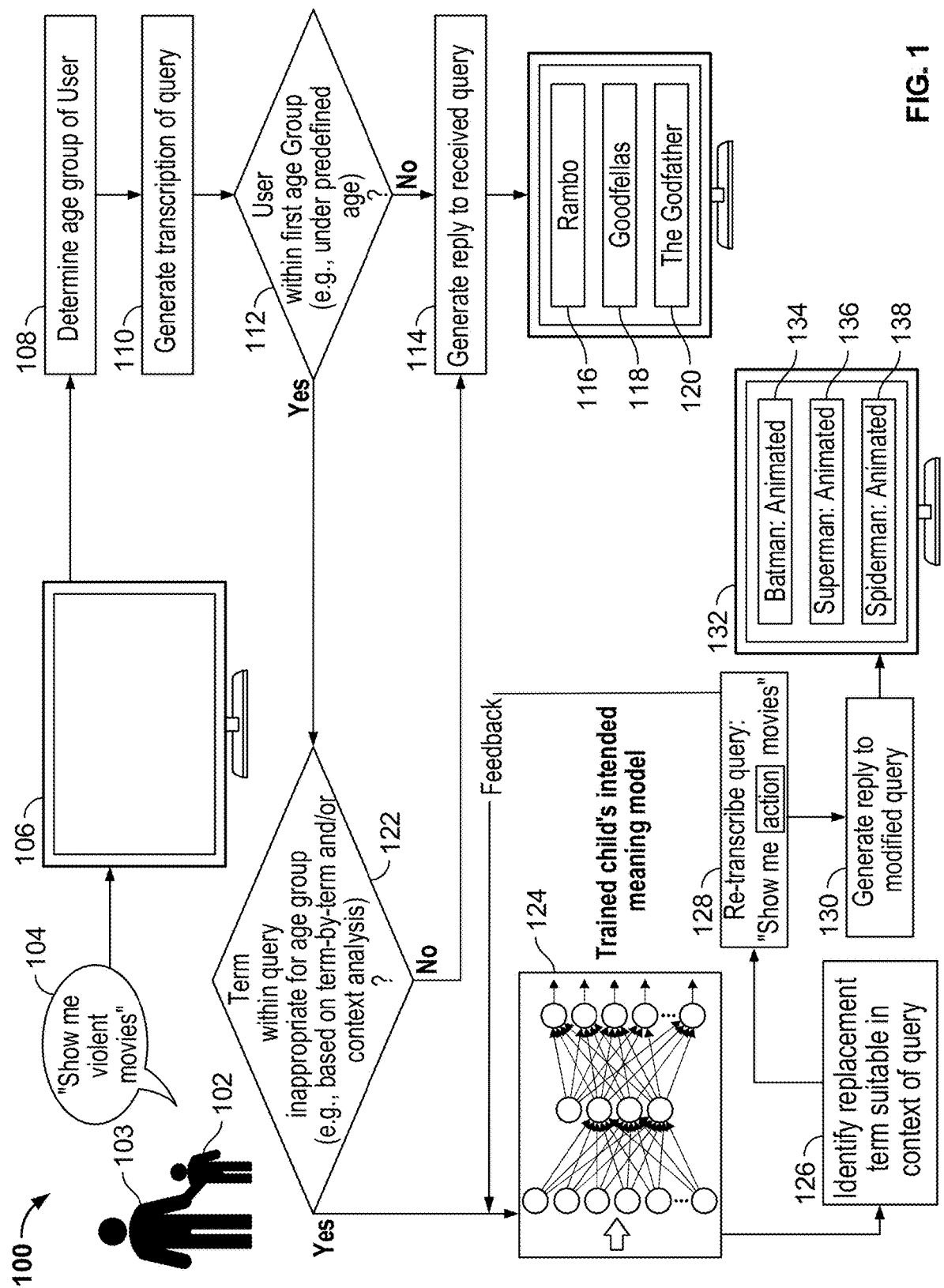
FIG. 1 shows a block diagram for modifying a term in a query with a replacement term, in accordance with some embodiments of this disclosure.

FIG. 1 shows a block diagram for modifying a term in a query with a replacement term, in accordance with some embodiments of this disclosure. A media application (e.g., executed at least in part on user equipment 106) receives query 104 (e.g., "Show me violent movies") from user 102. User 102 may be a child in a particular age group (e.g., 5-10 years old). In some embodiments, query 104 may be received from user 103 (e.g., a parent of child 102) in a particular age group (e.g., above age 30). The media application may receive the query in any suitable format (e.g., text-based input, audio or voice input, touch input, biometric input, or any combination thereof) via a suitable interface (e.g., input interface 610, microphone 618 of FIG. 6, etc.).

At 108, the media application may determine an age group of user 102 based on one or more of a variety of techniques. For example, the media application may (e.g., in a case that query 104 is in the form of voice or audio) identify various audio characteristics (e.g., word tone, word pitch, word emphasis, word duration, voice alteration, volume, speed, etc.) of query 104, and the identified audio characteristics may be compared to a table (e.g., stored at database 705 of FIG. 7) storing an association between audio characteristics and corresponding age groups. Based on such comparison, the media application may determine the audio characteristics in the database having a closest match to the identified audio characteristics, and determine that user 102 is within the age group associated with the audio characteristics determined to be the closest match.

Additionally or alternatively, one or more sensors (e.g., a camera) may be employed to determine the age group of user 102. For example, the media application may obtain captured images of user 102 and employ any suitable facial recognition algorithm and/or image processing technique to identify or extract various characteristics (e.g., facial features) of the user, and compare such identified features to features in a database (e.g., database 705 of FIG. 7) storing associations between facial characteristics and corresponding age groups. Based on such comparison, the media application may determine an age group of the user. In some embodiments, an age group of user 102 may be determined based on a profile associated with user 102, or whether the user is accessing an application that is configured to provide child-specific content.

At 110, the media application may (e.g., in a case that query 104 is received in the form of voice or audio) transcribe the input into a string of text using any suitable automatic speech recognition technique, or transcription of the audio signal may be achieved by external transcription services (e.g., Amazon Transcribe by Amazon, Inc. of Seattle, WA and Google Speech-to-Text by Google, Inc. of Mountain View, CA). The transcription of audio is discussed in more detail in U.S. patent application Ser. No. 16/397,004, filed Apr. 29, 2019, which is hereby incorporated by reference herein in its entirety. In a case that query 104 is received in the form of text or other user selection, the media application may not perform transcription of the query.

Various machine learning models may be employed to interpret received query 104, e.g., recurrent neural networks, bidirectional recurrent neural networks, LSTM-RNN models, encoder-decoder models, transformers, conditional random fields (CRF) models, etc. Such one or more models may be trained to take as input labeled audio files or utterances, and output one or more candidate transcriptions (e.g., 10-20 candidate transcriptions) of the audio file or utterance. In some embodiments, the media application may pre-process the received audio input for input into the neural network, e.g., to filter out background noise and/or normalize the signal, or such processing may be performed by the neural network.

In some embodiments, in generating the candidate transcriptions, the automatic speech recognition system may analyze the received audio signal to identity phonemes (i.e., distinguishing units of sound within a term) within the signal, and utilize statistical probability techniques to determine most likely next phonemes in the received query. For example, the neural network may be trained on a large vocabulary of words, to enable the model to recognize common language patterns and aid in the ability to identify candidate transcriptions of query 104. In some embodiments, a child-specific vocabulary is used for training the neural network, to enable the neural network to identify patterns common to how children of various age groups generally communicate. In some embodiments, a prediction of each term of a query may be associated with a confidence level. For example, if the term "adult" has not yet been learned by the neural network, a lower confidence value may be assigned to such prediction as compared to when the term "adult" has been learned by the neural network.

At 112, based on the determination at 108, the media application determines whether user 102 is within the first age group (e.g., is under a predefined age). If the media application determines that user 102 is not within the first age group, the media application may generate for output a reply to received query 104 (e.g., based on a top candidate transcription generated at 110) and perform a search based on received query 104, which may return recommended media assets 116, 118, 120. Such recommended media assets may be violent movies appropriate only for users of a certain age group (e.g., for a group of users 18 and over, separate from the first age group of 5-10 years old), and the media application may retrieve such recommended media assets from a content server or database (e.g., database 705 and/or media content source 702). At 114, the media application may provide recommended media assets 116, 118, 120 in response to determining that user 102 is within an age group permitted to view the media assets (e.g., based on the determination at 108 and/or based on comparison to a local parental control setting).

If the media application determines at 112 that user 102 is within the first age group (e.g., is within the 5-10-year-old age group), the media application may determine, at 122, whether one or more terms within query 104 are inappropriate for a user in such an age group (e.g., to determine whether a search executed based on a query with such term is likely to return media asset recommendations containing content objectionable for a user within the first age group). In some embodiments, the media application may perform such analysis on each of multiple candidate transcriptions of query 104.

Such determination of whether one or more terms within query 104 are inappropriate for the identified age group may comprise of a term-by-term analysis of query 104 and/or an analysis of a context of a term within the query. The media application may perform a term-by-term analysis of query 104 (e.g., "Show me violent movies") by comparing each term of query 104 to a database storing a list of terms flagged as inappropriate for users of the first group. For example, based on such comparison, the media application may determine that the term "violent" is inappropriate users of the first group. The media application may additionally or alternatively utilize machine learning techniques to perform the term-by-term analysis, and/or to perform a context analysis of a term within the query. For example, based on the term "violent" being flagged in the term-by-term analysis, the media application may determine whether "violent" in the context of "Show me violent movies" is appropriate for users in the first group.

In some embodiments, the media application may classify each term of a query as inappropriate or potentially objectionable (e.g., by assigning an "Adult" label to the term, which indicates that output based on a search using such term is likely to be appropriate only for users of a certain age) or appropriate (e.g., by assigning a "Generic" label to the term, which indicates that output based on a search using such term is likely to be appropriate for all users). A neural network, e.g., a long short-term memory (LSTM) neural network and/or a conditional random fields (CRF) model, may be employed to perform keyword spotting techniques and/or sequence prediction techniques to classify each term of a query. For example, for the query "Play adult movies," the terms "play" and "movies" may be labeled as "Generic", the term "adult" may be labeled as "Adult". On the other hand, for the query "Play cartoon movies," each term of such query may be labeled as "Generic," and the neural network may be trained based on a plurality of queries. In some embodiments, the term "adult", when received from users of certain age groups, may be understood to correspond to "non-cartoon," e.g., may refer to a media asset featuring one or more adults in the cast of the media asset. In such an instance, the presence of a term "adult" in the query may not be problematic for the query even if the user is within the first group (e.g., the "non-cartoon" indication may share an edge connection with "adult" in a knowledge graph, and may be utilized in a search for users in the first age group).

Various automatic speech recognition techniques may be employed by the media application to identify a context of a query, and subsequently determine whether the term within the identified context is appropriate for users of a certain age. For example, the media application may perform natural language processing (NLP) on the terms included in query 104 in order to determine a context of a term within the query. In some embodiments, rule-based NLP techniques or algorithms may be employed to parse text included in query 104. For example, NLP circuitry or other linguistic analysis circuitry may apply linguistic, sentiment, and grammar rules to tokenize words from a text string, and may perform chunking of the query, which may employ different techniques, e.g., N-gram extraction, skip gram, and/or edge gram; identify parts of speech (i.e., noun, verb, pronoun, preposition, adverb, conjunction, participle, article); perform named entity recognition; and identify phrases, sentences, proper nouns, or other linguistic features of the text string. In some embodiments, the media application may categorize a query with one or more data tags (e.g., as "Science" or "Mature") by extracting or analyzing entities or keywords (e.g., "violent" or "stem cell") from a string of terms in a query and compare the extracted keywords to historical queries (and/or metadata tags associated therewith), which may be stored in a database record of database (e.g., database 705 of FIG. 7). In some embodiments, machine learning models (e.g., a neural network) may be employed to discern the context of a term within a query, based on an analysis of surrounding terms within the query.

For example, based on such techniques, the media application may determine that the term "adult" within the query "Show me adult movies" denotes a context of "requesting a genre of movies for a mature audience, such as rated R movies" (e.g., based on "adult" immediately preceding "movies" within the query), which may be deemed inappropriate for younger children of a first age group. On the other hand, the media application may determine the context of the term "adult" in the query "Show me adult stem cell videos" corresponds to context of "biology" and/or "research" (e.g., based on the inference that "adult" preceding "stem cells" is a scientific topic, and is in this context is not referring to a genre of movies), which may be identified by the media application as a topic having educational value and thus appropriate for younger children of a first age group. In some embodiments, machine learning techniques may be employed to learn categories (e.g., genre) based on search histories of various users and/or a randomized set of queries.

In some embodiments, a neural network may be utilized, where the neural network comprises a sequence model configured to acquire and store knowledge of word strings, phrases and sentences. In some embodiments, the neural network may employ word embedding algorithms to perform the term-by-term analysis and/or to identify a context of a term within a query. For example, the neural network may utilize algorithms such as ELMo, as discussed in Peters et al., Deep contextualized word representations (2018) cite arxiv:1802.05365, Comment: NAACL 2018. Originally posted to openreview 27 Oct. 2017; and Bidirectional Encoder Representations from Transformers (BERT), as discussed in Devlin et al., BERT: Pre-training of Deep Bidirectional Transformers for Language Understanding, In Proceedings of NAACL-HLT 2019, pages 4171-4186, each of which is hereby incorporated by reference herein in their entirety.

If the media application determines, based on the processing performed at 122, that none of the terms within query 104 (taken alone or in the context of the query) are inappropriate for the identified age group, processing may proceed to 114, where the media application may generate for display recommended media assets (e.g., "Rambo" 116, "Goodfellas 118, "The Godfather" 120) based on received query 104. If, in the example of the FIG. 1, the media application determines the user is in the predefined age group (e.g., of 5-10 years old), the processing at 122 may result in a determination that the query is inappropriate for such age group. However, it is possible that the media application determines that the user is, for example, 13 years old, and if in such instance the media application determines that the query received from such user is likely to yield media assets with a rating of PG-13, the processing may move from 122 to 114. In some embodiments, the media application may select a query from among a plurality of transcribed queries that is determined not to be objectionable for the identified age group of user 102. For example, although several of the candidate queries may be determined by the media application to be inappropriate for the user, at least one of the candidate queries may be determined as appropriate for user 102 within the first age group, and a search for media assets may be performed based on such query.

On the other hand, if the media application determines at 122 that a term (e.g., "violent") within query 104 is inappropriate for the identified age group (e.g., 5-10 years old) based on at least one of the term-by-term analysis and the contextual analysis, processing proceeds to 124. In some embodiments, the media application may identify a plurality of candidate transcriptions, and processing may proceed to 122 if a majority of the plurality of candidate transcriptions are classified as inappropriate for the first age group, or a certain number of the top candidate transcriptions are classified as inappropriate for the first age group. In some embodiments, the determination of 122 may be performed at the transcription stage, the natural language processing stage or natural language understanding stage.

Figure 5:
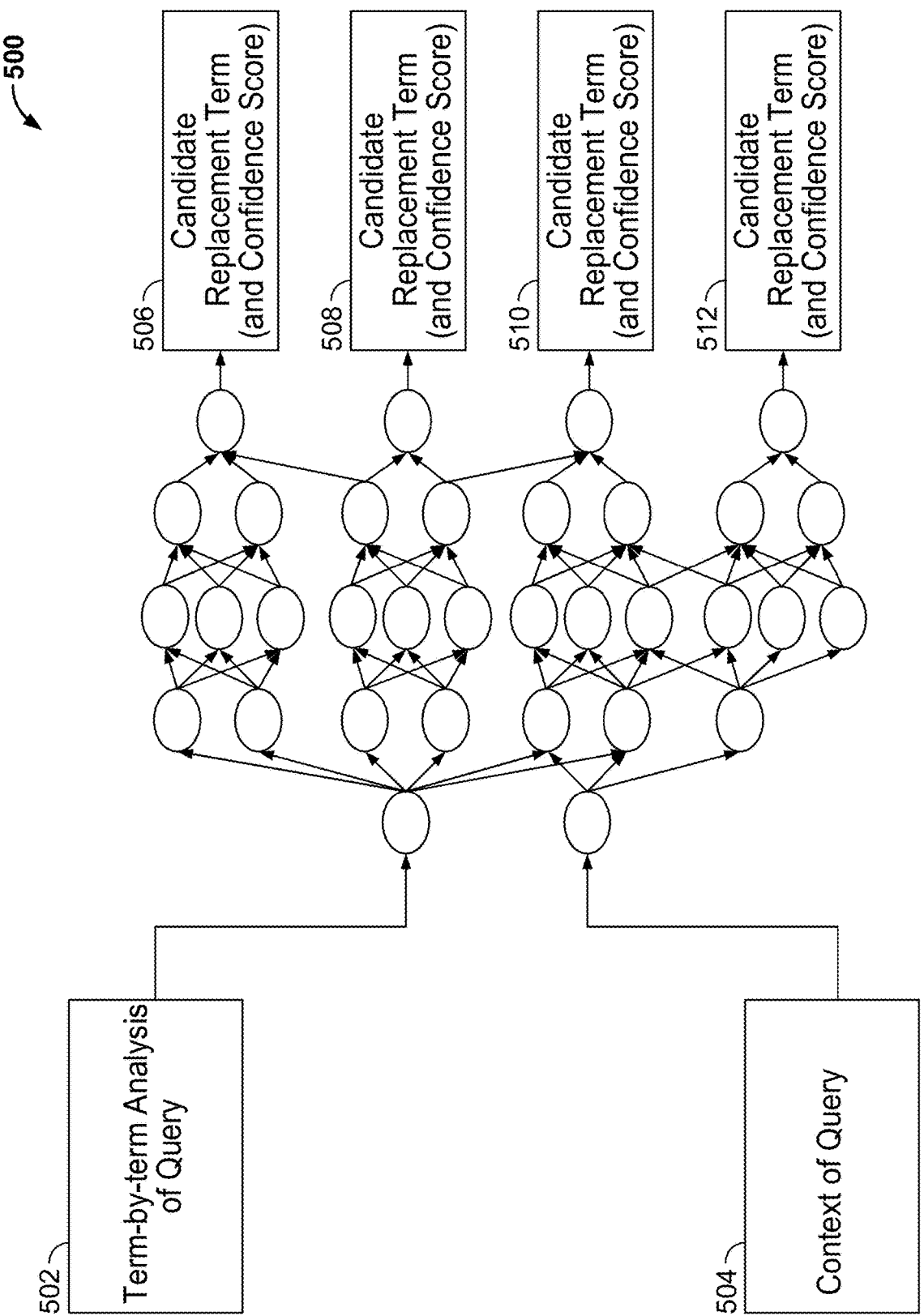
FIG. 5 shows a block diagram for an exemplary machine learning model to identify a replacement term for an inputted term of a query, in accordance with some embodiments of this disclosure.

At 124, the results of processing at 122 may be input into a child's intended meaning model (e.g., model 500 of FIG. 5). As discussed in further detail in connection with FIG. 5, the child's intended meaning model may be trained to accept as input a query (or results of a term-by term analysis of such query) and a context of the query determined at 122, and output one or more candidate replacement term(s) to replace one or more terms of the received query determined at 122 to be inappropriate for the particular age group. Such output may take into account the context of the query (e.g., to ensure that the replacement term is appropriate for user 102 in the context of a modified version of query 104 that includes the replacement term).

The child's intended meaning model may be trained based on training examples (e.g., labeled based on a feedback from users, such as whether the modifying the query with the replacement term led to consumption of recommended media assets returned based on the modified query, or whether one or more other queries were subsequently received after the modified query consuming a media asset; and/or may be labeled based on a survey of parents' responses, such as a parent indicating that by "violent" his or her child actually intended "action" movies, or otherwise labeled by human reviewers). In some embodiments, the child's intended meaning machine learning model may be a recurrent neural network, or LSTM (long short-term memory) network. In some embodiments, a knowledge graph, such as discussed in further detail in connection with FIG. 3, may be utilized by the media application (e.g., alone or in combination with machine learning models) to identify a replacement term.

At 126, the media application may identify a replacement term suitable in the context of the query, based on the output of the child's intended meaning model at 124 and/or relationships in a knowledge graph. For example, the media application may identify "action" as a replacement term for "violent" in received query 104, and at 128 modify query 104 to replace the term "violent" with "action" in the transcription of the query. Such modification may reflect the determination by the media application that, in connection with query 104 of "Show me violent movies," a child in the age group identified at 108 is likely to have intended that the term "violent" to refer to superhero or "action" movies, rather than R-rated violent movies more suitable for mature audiences. The media application may select the replacement term such that it is related to the term at issue in query 104. In some embodiments, the replacement term may be related in that such replacement term is likely to, in the context of query 104, preserve the intent of user 102 in query 104, and at the same time cause media recommendations provided to user 102 to be appropriate for the identified age group of user 102. In some embodiments, the replacement term may be related to the original term in the query in that the terms are within a predetermined distance on a knowledge graph (e.g., knowledge graph 300, as shown in more detail in FIG. 3). In some embodiments, the replacement term may be related to the original term in the query in that each of such terms is associated with a user profile of user 202, e.g., based on commonly watched media assets or searches by user 202, or commonly watched media assets or searches by users that are within the same age group as user 202.

In some embodiments, the media application may identify a type of the term in the query that is to be replaced or mutated by the replacement term. For example, the term "adult" may be tagged as a genre (e.g., based on a training set used to train a neural network, and/or based on comparison of the term to terms stored in a database labeled as specific genres), and the replacement term may be selected the same type of term (e.g., a genre of "good" or "nice" movies). In some embodiments, the media application may modify query 104 based on the age group identified at 108. For example, the media application may modify query 104 for the first age group (e.g., ages 5-10) differently than for a second age group (e.g., ages 13-15), to enable media asset recommendations returned based on the query to be more suitable for the identified age group (e.g., popular media assets for the relevant age group).

At 132, the media application may generate for output the modified query, and perform a search based on the modified query (e.g., "Show me action movies"), and such search may return from a database (e.g., media content source 702) media asset recommendations (e.g., "Batman: Animated" 134, "Superman: Animated" 136, "Spiderman: Animated" 138) suitable for the age group of the user identified at 108. For example, the media application may determine that superhero movies are suitable "action" movies for the identified age group (e.g., 5-10 years old).

In some embodiments, the media application may receive feedback (e.g., explicit or implicit) based on the recommended content. For example, the media application may receive explicit feedback in the form of ratings, or likes and dislikes, of the recommended content. For example, the media application may determine based on such feedback that "action" is not a suitable substitute for "violent", but "adventure" or "exciting" are suitable substitutes. In some embodiments, the media application may receive the implicit feedback in the form of various metrics (e.g., whether the user consumed a threshold amount of one or more of the media assets recommended to the user, whether the user immediately exited out of the media application after receiving the media asset recommendations, etc.).

In some embodiments, query 104 may be received from user 103 (e.g., a parent of user 102) rather than user 102 (e.g., a child of user 103), but the media application may nonetheless deem query 104 to have been received from user 102 belonging to a first age group (e.g., to ensure that media asset recommendations provided in response to query 104 are appropriate for user 102). For example, the media application may perform analysis of query 104 to ensure that recommended content is appropriate for all users detected to be in a vicinity of user equipment 106. In some embodiments, user 103 may be permitted to enter a PIN or password to override the modified query (e.g., watch the movies more suitable for a mature audience, such as when user 102 is not paying attention to user equipment 106 or user 102 is sleeping).

Figure 2:
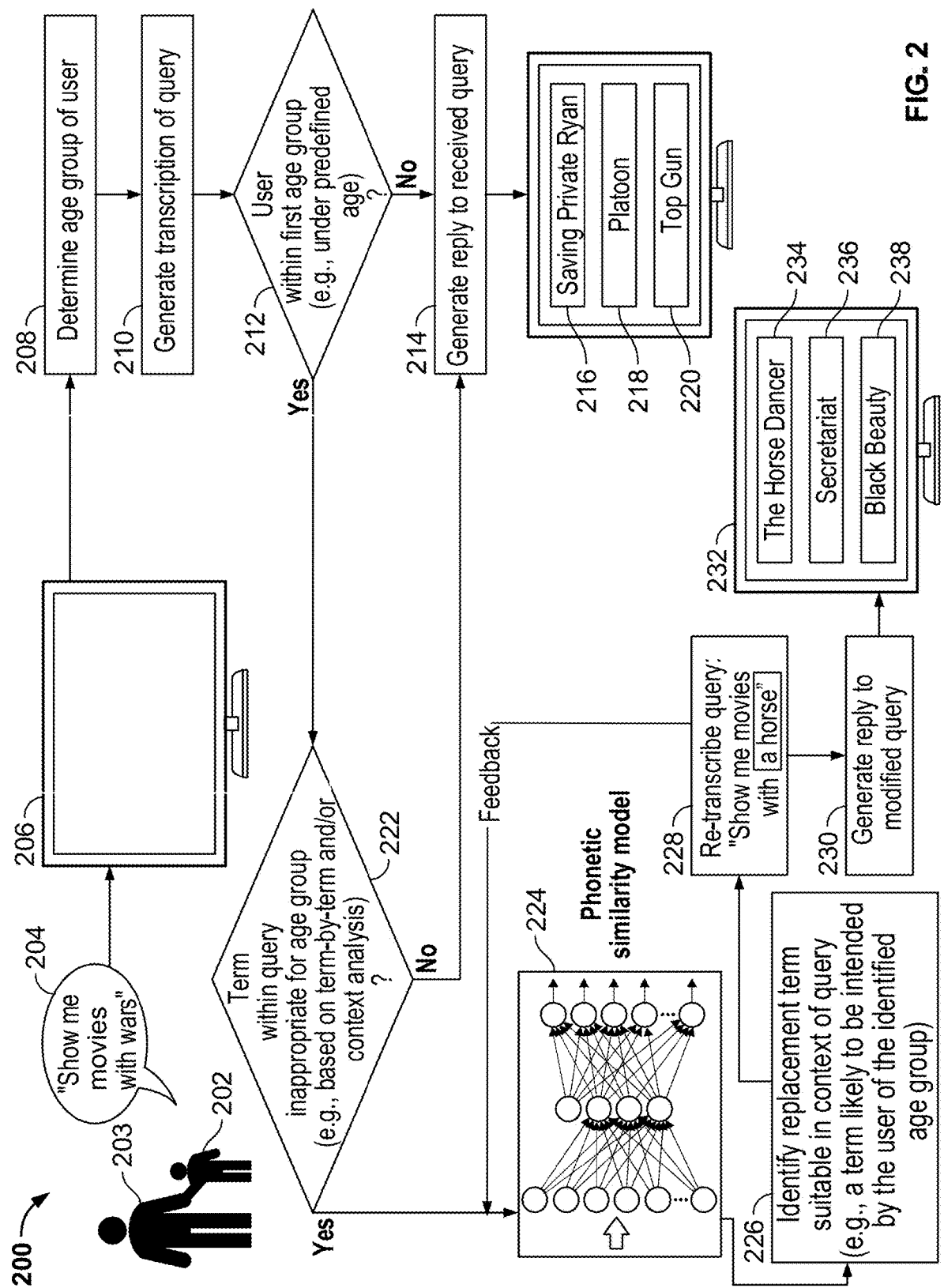
FIG. 2 shows a block diagram for modifying a term in a query with a replacement term, in accordance with some embodiments of this disclosure.

FIG. 2 shows a block diagram for modifying a term in a query with a replacement term, in accordance with some embodiments of this disclosure. The example of FIG. 2 is similar to the example of FIG. 1. In the example of FIG. 2, a phonetic similarity machine learning model may alternatively or additionally be employed. The media application (e.g., running at least in part on user equipment 206) receives query 204 from user 202, e.g., "Show me movies with wars." At 208, the media application may determine an age group of user 202 in a similar manner as at 108 of FIG. 1.

At 210, the media application may generate candidate transcriptions in a similar manner as at 110 of FIG. 1. If the media application determines at 212 the user is not within the first age group (e.g., and instead is part of an age group for which movies with mature content are appropriate), the media application may generate for display at user equipment 206 media asset recommendations 216, 218, 220 (e.g., movies depicting wars, suitable for a mature audience) based on a search performed at 214.

If the media application determines at 212 the user is within the first age group (e.g., 5-10 years old), processing may continue to 222, which may be performed in a similar manner to 122 of FIG. 1. In response to the media application determining that query 204 (e.g., "Show me movies with wars") includes a term (e.g., "wars") that is inappropriate for the identified age group within the context of the query, processing moves to 224. On the other hand, if the media application determines that no particular terms of query 204 are inappropriate for user 202 within the context of query 204, processing may proceed to 214, to provide recommended media assets 216, 218, 220 based on query 204 in its original form.

At 224, the results of processing at 222 may be input into a phonetic similarity model. As discussed in further detail in connection with FIG. 5, the phonetic similarity model may be trained to accept as input a query (or term-by-term analysis of such query) and a context of the query determined at 222, and output one or more candidate replacement term(s) to replace one or more terms of the received query determined to be inappropriate for the particular age group. The replacement term may be selected based at least in part on having significant overlap in phonetic properties with the inputted term, while preserving the likely intent of user 202 in inputting query 204. The phonetic similarity model may be trained based on training examples (e.g., based on user feedback; labeled based on a survey of parents' responses, such as a parent indicating a term commonly mispronounced term by his or her child, or otherwise labeled by human reviewers). The phonetic similarity model may be trained on a large corpus of training examples (e.g., which may be phonetically labeled). In some embodiments, the child's intended meaning machine learning model may be a recurrent neural network, or LSTM (long short-term memory) network. In some embodiments, a knowledge graph, such as discussed in further detail in connection with FIG. 4, may be utilized by the media application (e.g., alone or in combination with machine learning models) to identify a replacement term. In some embodiments, various phonetic algorithms may be employed (e.g., the Soundex algorithm, the Metaphone algorithm, the double Metaphone algorithm New York State Identification and Intelligence System Phonetic Code (NYSIIS algorithm) or any other suitable algorithm). For example, similarity scores may be assigned as between a pair of terms determined to be phonetically similar.

The media application may perform steps 224, 226, 228 in a similar manner to steps 124, 126, 128, respectively, of FIG. 1, except that the term "wars" in original query 204 may be replaced with (e.g., re-transcribed with) the term "a horse," e.g., the media application may identify "horse" as a term that is phonetically similar to the flagged term "wars," commonly mispronounced by users within the identified age group, and appropriate within the context of query 204 (e.g., likely to yield media asset recommendations suitable for the identified age group of user 202).

At 230, the media application may generate for output the modified query, and generate for presentation recommended media assets 232, 234, 236, each relating to a horse, as indicated in the modified version of query 204.

In some embodiments, the media application may receive feedback (e.g., explicit or implicit) based on the recommended content. For example, the media application may receive explicit feedback in the form of ratings, or likes and dislikes, of the recommended content, and/or implicit feedback in the form of various metrics (e.g., whether the user consumed a threshold amount of one or more of the media assets recommended to the user, whether the user immediately exited out of the media application after receiving the media asset recommendations, etc.).

In some embodiments, query 204 may be received from user 203 (e.g., a parent of user 202) rather than user 202 (e.g., a child of user 203), but the media application may nonetheless deem query 204 to have been received from user 202 belonging to a first age group (e.g., to ensure that media asset recommendations provided in response to query 204 are appropriate for user 202). For example, the media application may perform analysis of query 204 to ensure that recommended content is appropriate for all users detected to be in a vicinity of user equipment 106.

In some embodiments, identifying a suitable replacement term may comprise inputting the term at issue into each of child's intended meaning model 124 and phonetic similarity model 224. For example, if a query (e.g., "Show me violent movies") is received by the media application, such query may be input into each of child's intended meaning model 124 and phonetic similarity model 224 along with the identified context of the term "violent" within the query. Child's intended meaning model 124 may output a replacement term of "action" (e.g., reflecting a determination that while the child uttered "violent" he or she actually intended "action"). Phonetic similarity model 224 may output a replacement term "Violet" (e.g., reflecting a determination that the child intended Violet Parr from the movie "The Incredibles" rather than "violent"). The media application may perform one or more techniques based on the output replacement terms. For example, the media application may use the replacement term associated with a higher confidence score as the replacement term for the modified query, or based on which replacement term is more closely related to viewing history or preferences of a user profile. The media application may alternatively present each modified query to the user before executing the search, to permit the user to select one of the modified queries, or generate for presentation to the user media asset recommendations based on executing respective modified queries comprising the replacement terms.

Figure 3:
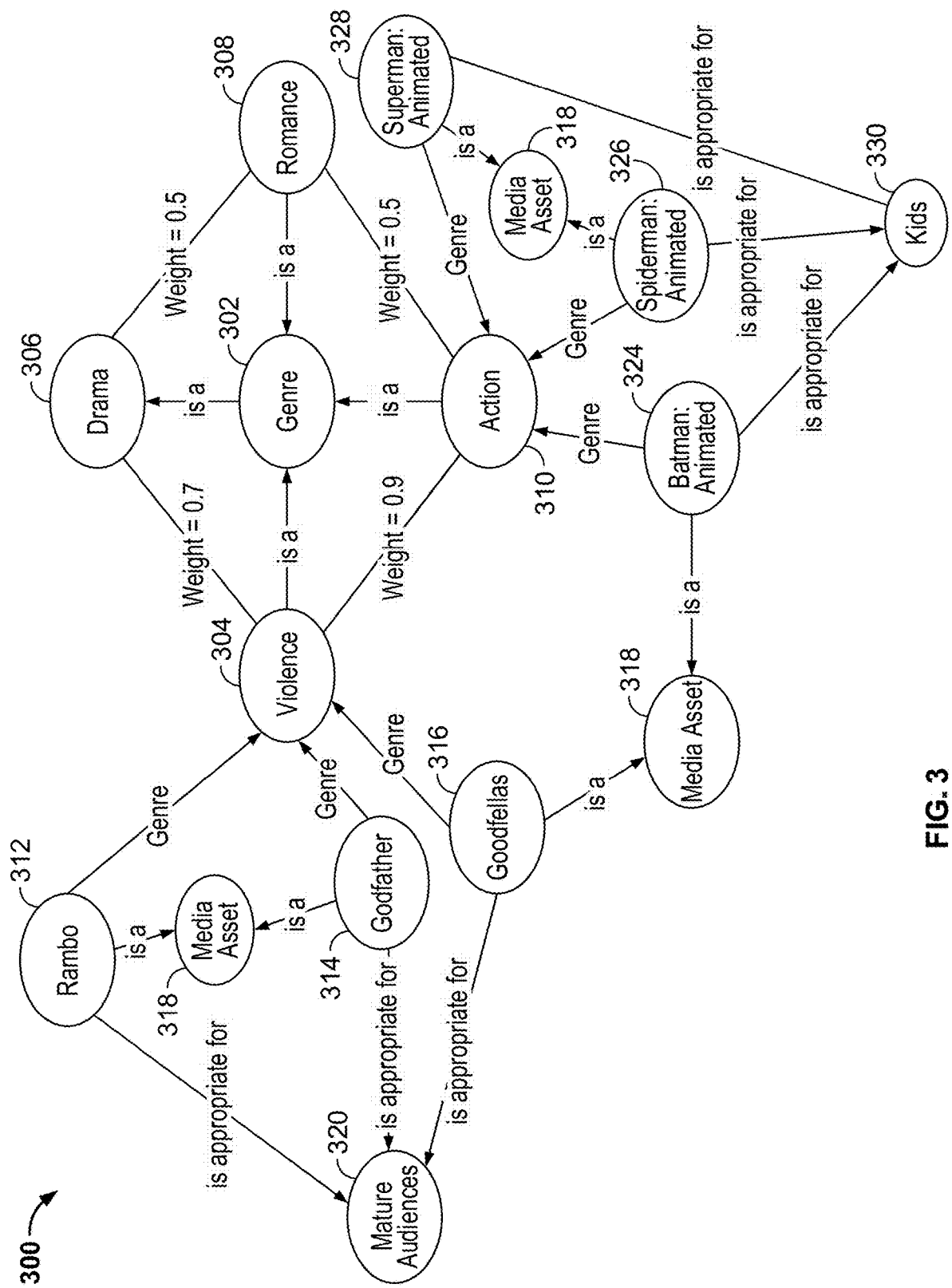
FIG. 3 shows an exemplary knowledge graph, in accordance with some embodiments of this disclosure.

FIG. 3 shows an exemplary knowledge graph 300, in accordance with some embodiments of this disclosure. Knowledge graph 300 may comprise nodes (e.g., representing entities, such as persons, places, things, etc.) and edges representing relationships between the nodes, where relatedness between node may be a function of one or more of connections between nodes, a distance between the nodes, and a weight assigned to a connection between nodes. The media application may utilize the knowledge graph to provide a suitable replacement term for a query (e.g., query 104 of FIG. 1), and knowledge graph 300 may be stored in a database (e.g., database 705 of FIG. 7). Knowledge graph 300 may be used alone, or used in combination with (or be included as part of) child's intended meaning machine learning model 124 of FIG. 1.

In some embodiments, the absence of an edge between two nodes of knowledge graph 300 may denote that no association between such nodes exists. In some embodiments, an edge between two entities in knowledge graph 300 may be associated with a weight (e.g., a real number, which may be normalized to a predefined interval) that reflects how likely the nodes connected by the edge are to be associated in a given context. For example, a relatively high weight may serve as an indication that there is a strong link between the nodes connected by the edge. Conversely, a relatively low weight may indicate that there is a weak association between the nodes connected by the edge.

As an example of how knowledge graph 300 may be utilized in connection with some embodiments of the present disclosure, if the media application receives query 104 (e.g., "Show me violent movies") of FIG. 1, the media application may reference knowledge graph 300 to determine that the term "violence" in such query is a genre, based on the edge connecting nodes 302 and 304. The media application may further determine that each of nodes 312, 314, 316, each having edge connections with "violence" node 304, is a media asset, based on nodes 312, 314, 316 having edge connections with node 318, and that such media assets are appropriate for mature audiences, based on edge connections between nodes 312, 314, 316 and node 320. Thus, the media application may determine that a media asset recommendation from a genre more suitable for a younger audience would be more appropriate, e.g., if, in the example of FIG. 1, the media application determines that query 104 was received from user 102, who is within the first age group (e.g., age 5-10).

The media application may reference knowledge graph 300 to determine a genre that is closest to the genre (e.g., "violence" 304) associated with the received query 104 of FIG. 1. For example, the media application may determine that an edge connecting node 304 and node 310 is associated with a weight of 0.9, representing a strong association between the "violence" genre and the "action" genre (e.g., as compared to a smaller weight of 0.7 of the edge connection between node 304 and node 306 representing the "drama" genre having a comparatively weaker connection with the "violence" genre). The media application may further determine that each of nodes 324, 326, 328, having an edge connection with node 310 representing the "action" genre, has an edge connection with node 330, indicating that each of such nodes 324, 326, 328 is a media asset appropriate for kids (e.g., ages 5-10 in the identified first age group of FIG. 1). Based on the above-described traversal of knowledge graph 300, the media application may perform the modification of query 104 of FIG. 1, to replace the identified genre of "violence" in original query 104 with the genre "action," and provide media asset recommendations based the media assets identified in nodes 324, 326, 328.

Figure 4:
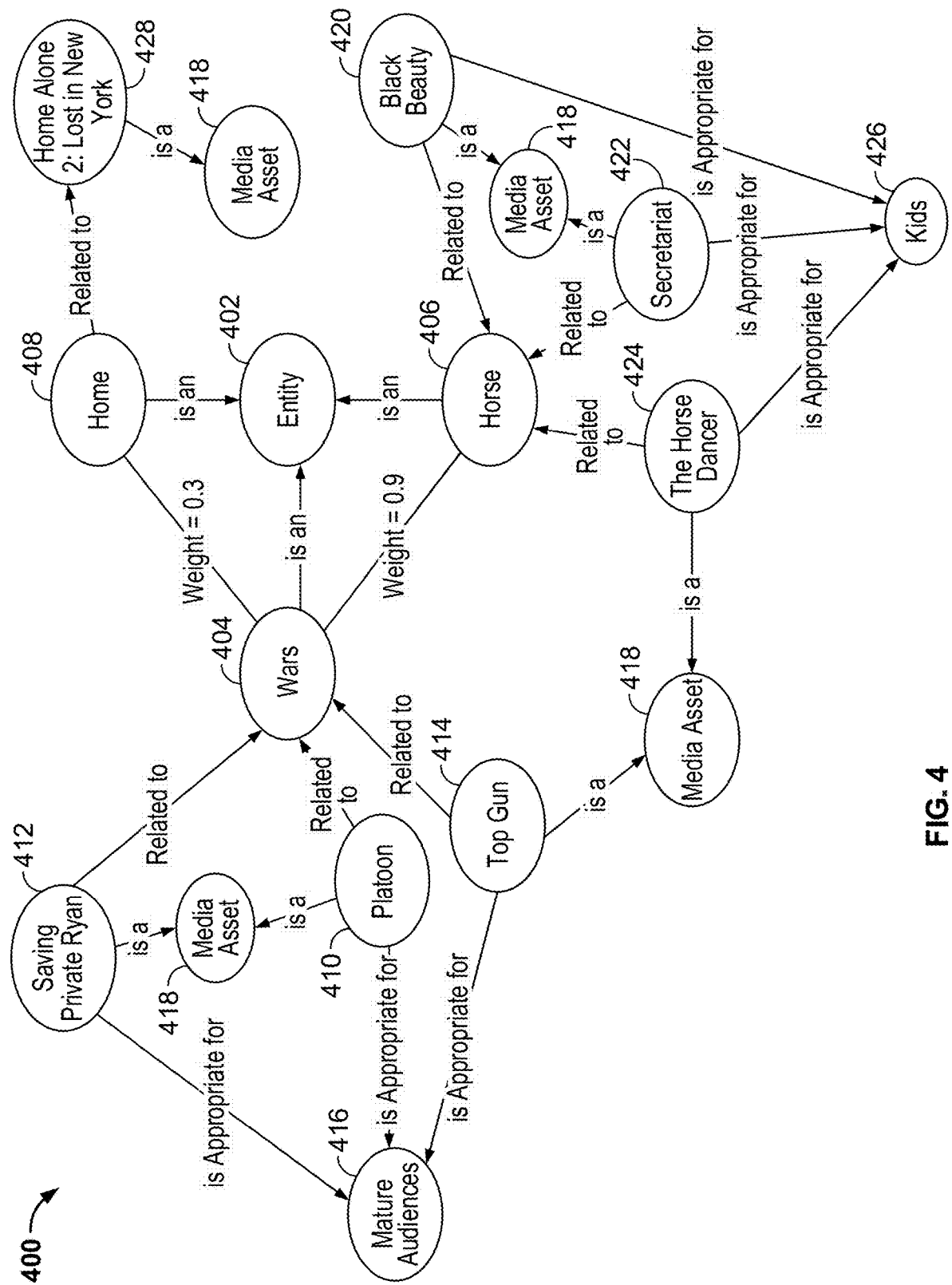
FIG. 4 shows an exemplary knowledge graph, in accordance with some embodiments of this disclosure.

FIG. 4 shows an exemplary knowledge graph 400, in accordance with some embodiments of this disclosure. Knowledge graph 400 may be similar to knowledge graph 300 of FIG. 3, except that knowledge graph 400 may be primarily used alone or in combination with (or included as a part of) phonetic similarity model 224 of FIG. 2.

As an example of how knowledge graph 400 may be utilized in connection with some embodiments of the present disclosure, if the media application receives query 204 (e.g., "Show me movies with wars") of FIG. 2, the media application may reference knowledge graph 400 to determine that the term "wars" in such query is an entity, based on the edge connection representing an association between node 402 and node 404. The media application may further determine that the entity "wars" of node 404 is related to nodes 410, 412 and 414, and that such nodes 410, 412, 414 have an edge connection with node 418 indicating that nodes 410, 412 and 414 are media assets. Based on the edge connections between nodes 410, 412, 414 and node 416, the media application may determine that the media assets associated with nodes 410, 412, 414 are suitable only for mature audiences (and thus not suitable to be recommended to user 202 of FIG. 2).

In response to such determination, the media application may identify other entities that may serve as a suitable replacement term for the term "wars" associated with node 404. The weights of the edge connections between nodes 404 and 406, and nodes 404 and 408, may represent a phonetic similarity between the terms of such nodes. For example, as a result of the media application determining (e.g., based on one or more algorithms, and/or based on feedback from users such as parents as to words or terms commonly mispronounced by children) that there is a strong phonetic similarity between the term "wars" associated with node 404 and the term "horse" associated with node 406, and a relatively high weight (e.g., 0.9/1.0) may be assigned to the phonetic similarity as between nodes 404 and 406. On the other hand, the media application may determine that the phonetic similarity between nodes 404 and 408 is comparably weaker (e.g., "wars" is not considered to be phonetically similar to "home"), and thus a relatively lower weight (e.g., 0.3/1.0) may be assigned to a phonetic similarity as between nodes 404 and 408.

The media application may identify "horse" as a possible replacement term for "wars" in query 204 of FIG. 2 based on the weights assigned to the edge connection between nodes 404 and 406, and based on determining that nodes 420, 422, and 424 are media assets suitable for consumption by kids (where such determination is based on the edge connections between nodes 420, 422, and 424 and 418, and nodes 420, 422, and 424 and 426). For example, if the media application determines that a media asset recommendation from a genre more suitable for a younger audience would be more appropriate, e.g., if, in the example of FIG. 2, the media application determines that query 204 was received from user 202 within the first age group (e.g., age 5-10), the media assets associated with nodes 420, 422, and 424 may be provided as media asset recommendations to user 202.

FIG. 5 shows a block diagram for an exemplary neural network machine learning model 500 to identify a replacement term for an inputted term of a query, in accordance with some embodiments of this disclosure. In some embodiments, the child's intended meaning model at 124 of FIG. 1, and/or the phonetic similarity model at 224 of FIG. 2, may correspond to machine learning model 500. Machine learning model 500 may be configured to accept as input a query or a term-by-term analysis of a query 502 and a context 504 of a query and output one or more candidate replacement terms 506, 508, 510, 512. In some embodiments, a confidence score for each candidate replacement term may be computed, representing a likelihood that the associated replacement term is suitable to replace an identified term in the received query. It should be appreciated that any number of candidate replacement terms, and corresponding confidence scores, may be provided. In some embodiments, a child-specific vocabulary is used for training the neural network.

The neural network may be trained with labeled training examples (e.g., including a query or a term-by-term analysis of a query 502, a context 504 of a query, and a replacement term inserted in place of a term of the query suitable for the context of the query and appropriate for a specific age group). Such labeled training examples may be stored in a database (e.g., database 705 of FIG. 7) Based on such training, the neural network model may identify certain features or patterns of a query and/or context of the query that are predictive of a particular replacement term and the trained neural network model may apply such learned inferences and patterns to received queries and context pairs. The media application may pre-process the query 502 and context 504 to generate one or more vectors indicative of key features of the query 502 and context 504, and such vectors may be input into trained neural network 500.

In some embodiments, the machine learning algorithm may be trained based on feedback derived from actions of users. For example, if the media application determines that a child-user has input a query and received no results, or did not select any of the results, but then subsequently performed another search, the subsequent search may provide insight into what the user actually intended. For example, if the a search for "violent movies" is received, but the system returns no results based on the search, but then searches for "spiderman" immediately thereafter, the media application may infer that by "violent" the child-user actually meant "action" or "superhero," and the model may be refined in accordance with such inference.

As another example, if a replacement term is inserted into a query, and a user immediately begins consuming a media asset provided to the user as a result of the modified query, the model may be refined or updated to increment a weight associated with such replacement term for future similar queries and contexts. On the other hand, if a replacement term is inserted into a query, and a user performs multiple subsequent searches before consuming a media asset, or does not consume a media asset at all during the viewing session, the model may be refined or updated to decrement a weight associated with such replacement term for future similar queries and contexts. In some embodiments, the model may be refined in response to explicit feedback from users (e.g., based on feedback received from a user of liking or disliking a search performed based on a modified query). Over time, relevancy and accuracy may be achieved as to what media content a user of a particular age group is expecting to receive based on particular search queries. Neural networks are discussed in more detail in connection with U.S. Patent Application Publication No. US 2017/0161772 A1 to Xu et al., published Jun. 8, 2017, and US 2020/0183773 A1 to Brehm, published Jun. 11, 2020, each of which is hereby incorporated by reference herein in its entirety.

In some embodiments, the media application may employ a word (or phrase or sentence) embedding machine learning model to recommend a semantically similar replacement term. For example, a text corpus may be used to train a word embedding machine learning model, in order to represent each word as a vector in a vector space. In some embodiments, a Word2Vec machine learning model may be employed as the word embedding machine learning model. The Word2Vec model may contain plural models, one of which may be an unsupervised deep learning machine learning model used to generate vector representations (e.g., word embeddings) of words in a corpus of text used to train the model. The generated vectors are indicative of contextual and semantic similarity between the words in the corpus. In training the Word2Vec model, a neural network may be employed with a single hidden layer, where the weights of the hidden layer correspond to the word vectors being learned. Word2Vec may utilize the architectures of a Continuous Bag of Words model or a Continuous Skip-gram model to generate the word embeddings, as discussed in Mikolov et al., Efficient Estimation of Word Representations in Vector Space, ICLR Workshop, 2013, which is hereby incorporated by reference herein in its entirety. A cosine similarity operation as between respective angles may be used to determine the similarity between words.

In some embodiments, the media application performs operations on word embeddings included in the phrase or sentence (e.g., to compute an average or weighted average of word vectors in the sentence), and performs a cosine similarity operation as between the computed vectors to determine sentence similarity. In some embodiments, one or more machine learning models may be used by the system to obtain sentence or phrase embeddings of queries, such as discussed in Le et al., "Distributed Representations of Sentences and Documents," In Proceedings of the 31st International Conference on Machine Learning, PMLR 32(2):1188-1196, 2014, which is hereby incorporated by reference herein in its entirety. In some embodiments, a machine learning model may return a confidence score as between candidate replacement terms 506, 508, 510, 512, based at least in part on the identified word embeddings.

In some embodiments, the media application may employ multiple machine learning models. For example, the media application may input a query, and a context of a term within a query, into each of the child's intended meaning model at 124 of FIG. 1, and/or the phonetic similarity model at 224 of FIG. 2. Based on a respective confidence scores associated with the replacement term output by the child's intended meaning model at 122 of FIG. 1, and/or the phonetic similarity model at 224, the media application may select the optimal replacement term. For example, employing such arrangement may assist the media application in determining whether the query received from the user is likely a mispronunciation (e.g., terms commonly mispronounced by users of a certain age) or is more likely to be a term misused by the user (e.g., terms commonly misused by users of a certain age).

Figure 6:
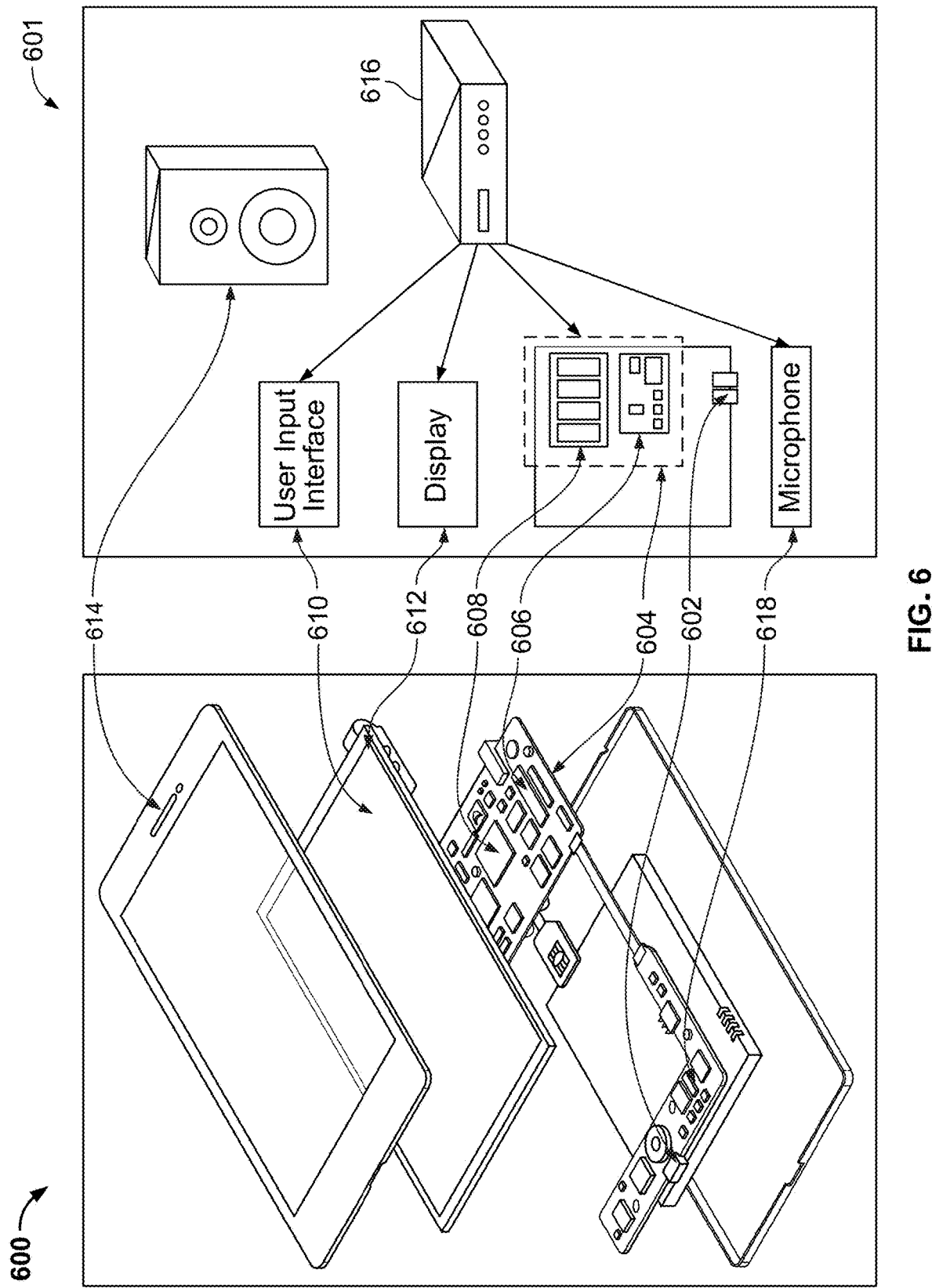
FIG. 6 shows a block diagram of an illustrative media device, in accordance with some embodiments of this disclosure.
Figure 7:
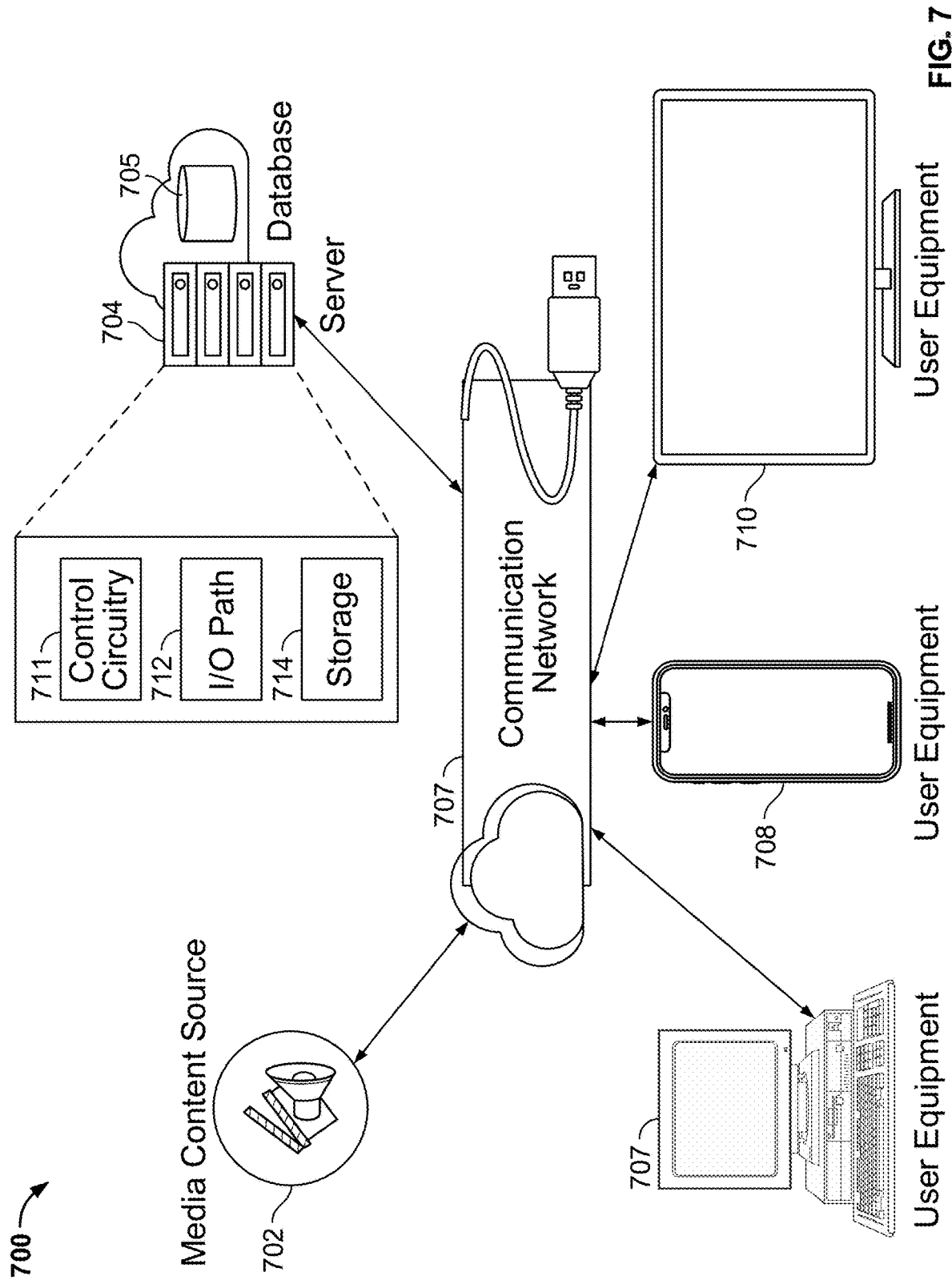
FIG. 7 shows a block diagram of an illustrative media system, in accordance with some embodiments of this disclosure.

FIGS. 6-7 describe exemplary devices, systems, servers, and related hardware for modifying a term in a query with a replacement term, in accordance with some embodiments of the present disclosure. FIG. 6 shows generalized embodiments of illustrative user equipment devices 600 and 601. For example, user equipment device 600 may be a smartphone device. In another example, user equipment system 601 may be a user television equipment system (e.g., user equipment 106 of FIG. 1). User television equipment system 601 may include set-top box 616. Set-top box 616 may be communicatively connected to microphone 618, speaker 614, and display 612. In some embodiments, microphone 618 may receive voice commands for the media application. In some embodiments, display 612 may be a television display or a computer display. In some embodiments, set-top box 616 may be communicatively connected to user input interface 610. In some embodiments, user input interface 610 may be a remote control device. Set-top box 616 may include one or more circuit boards. In some embodiments, the circuit boards may include processing circuitry, control circuitry, and storage (e.g., RAM, ROM, Hard Disk, Removable Disk, etc.). In some embodiments, the circuit boards may include an input/output path. More specific implementations of user equipment devices are discussed below in connection with FIG. 6. Each one of user equipment device 600 and user equipment system 601 may receive content and data via input/output ("I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602, which may comprise I/O circuitry. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media application stored in memory (i.e., storage 608). Specifically, control circuitry 604 may be instructed by the media application to perform the functions discussed above and below. In some implementations, any action performed by control circuitry 604 may be based on instructions received from the media application.

In client/server-based embodiments, control circuitry 604 may include communications circuitry suitable for communicating with a media application server or other networks or servers. The instructions for carrying out the above mentioned functionality may be stored on a server (which is described in more detail in connection with FIG. 6. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media application data described above. Nonvolatile memory may also be used (e.g., to launch a boot-up routine and other instructions). Cloud-based storage, described in relation to FIG. 6, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of user equipment 600.

Circuitry 604 may also include digital-to-analog converter circuitry and analog-to-digital converter circuitry for converting between digital and analog signals. The tuning and encoding circuitry may be used by user equipment device 600, 601 to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment device 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of each one of user equipment device 600 and user equipment system 601. For example, display 612 may be a touchscreen or touch-sensitive display. In such circumstances, user input interface 610 may be integrated with or combined with display 612. Display 612 may be one or more of a monitor, a television, a display for a mobile device, or any other type of display. A video card or graphics card may generate the output to display 612. The video card may be any processing circuitry described above in relation to control circuitry 604. The video card may be integrated with the control circuitry 604. Speakers 614 may be provided as integrated with other elements of each one of user equipment device 600 and user equipment system 601 or may be stand-alone units. The audio component of videos and other content displayed on display 612 may be played through the speakers 614. In some embodiments, the audio may be distributed to a receiver (not shown), which processes and outputs the audio via speakers 614.

The media application may be implemented using any suitable architecture. For example, it may be a stand-alone application wholly-implemented on each one of user equipment device 600 and user equipment system 601. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to rearrange the segments as discussed. Based on the processed instructions, control circuitry 604 may determine what action to perform when input is received from user input interface 610. For example, movement of a cursor on a display up/down may be indicated by the processed instructions when user input interface 610 indicates that an up/down button was selected.

In some embodiments, the media application is a client/server-based application. Data for use by a thick or thin client implemented on each one of user equipment device 600 and user equipment system 601 is retrieved on-demand by issuing requests to a server remote to each one of user equipment device 600 and user equipment system 601. In one example of a client/server-based guidance application, control circuitry 604 runs a web browser that interprets web pages provided by a remote server. For example, the remote server may store the instructions for the application in a storage device. The remote server may process the stored instructions using circuitry (e.g., control circuitry 604) to perform the operations discussed in connection with FIGS. 1-5 and 8-9.

In some embodiments, the media application may be downloaded and interpreted or otherwise run by an interpreter or virtual machine (run by control circuitry 604). In some embodiments, the media application may be encoded in the ETV Binary Interchange Format (EBIF), received by the control circuitry 604 as part of a suitable feed, and interpreted by a user agent running on control circuitry 604. For example, the media application may be an EBIF application. In some embodiments, the media application may be defined by a series of JAVA-based files that are received and run by a local virtual machine or other suitable middleware executed by control circuitry 604. In some of such embodiments (e.g., those employing MPEG-2 or other digital media encoding schemes), the media application may be, for example, encoded and transmitted in an MPEG-2 object carousel with the MPEG audio and video packets of a program.

FIG. 7 is a diagram of an illustrative streaming system, in accordance with some embodiments of the disclosure. User equipment devices 707, 707, 710 (e.g., user equipment device 106) may be coupled to communication network 706. Communication network 706 may be one or more networks including the Internet, a mobile phone network, mobile voice or data network (e.g., a 4G or LTE network), cable network, public switched telephone network, or other types of communication network or combinations of communication networks. Paths (e.g., depicted as arrows connecting the respective devices to the communication network 706) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 7 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 706.

System 700 includes a media content source 702 and a server 704, which may comprise or be associated with database 705. Communications with media content source 702 and server 704 may be exchanged over one or more communications paths but are shown as a single path in FIG. 7 to avoid overcomplicating the drawing. In addition, there may be more than one of each of media content source 702 and server 704, but only one of each is shown in FIG. 7 to avoid overcomplicating the drawing. If desired, media content source 702 and server 704 may be integrated as one source device.

In some embodiments, server 704 may include control circuitry 711 and a storage 714 (e.g., RAM, ROM, Hard Disk, Removable Disk, etc.). Server 704 may also include an input/output path 712. I/O path 712 may provide device information, or other data, over a local area network (LAN) or wide area network (WAN), and/or other content and data to the control circuitry 711, which includes processing circuitry, and storage 714. The control circuitry 711 may be used to send and receive commands, requests, and other suitable data using I/O path 712, which may comprise I/O circuitry. I/O path 712 may connect control circuitry 704 (and specifically processing circuitry) to one or more communications paths.

Control circuitry 711 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 711 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 711 executes instructions for an emulation system application stored in memory (e.g., the storage 714). Memory may be an electronic storage device provided as storage 714 that is part of control circuitry 711.

Server 704 may retrieve guidance data from media content source 702, process the data as will be described in detail below, and forward the data to \ user equipment devices 707 and 710. Media content source 702 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 702 may be the originator of content (e.g., a television broadcaster, a Webcast provider, etc.) or may not be the originator of content (e.g., an on-demand content provider, an Internet provider of content of broadcast programs for downloading, etc.). Media content source 702 may include cable sources, satellite providers, on-demand providers, Internet providers, over-the-top content providers, or other providers of content. Media content source 702 may also include a remote media server used to store different types of content (including video content selected by a user), in a location remote from any of the client devices. Media content source 702 may also provide metadata that can be used to identify important segments of media content as described above.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 704), which may be located centrally or at distributed locations, that provide cloud-based services to various types of users and devices connected via a network such as the Internet via communication network 706. In such embodiments, user equipment devices may operate in a peer-to-peer manner without communicating with a central server.

Figure 8:
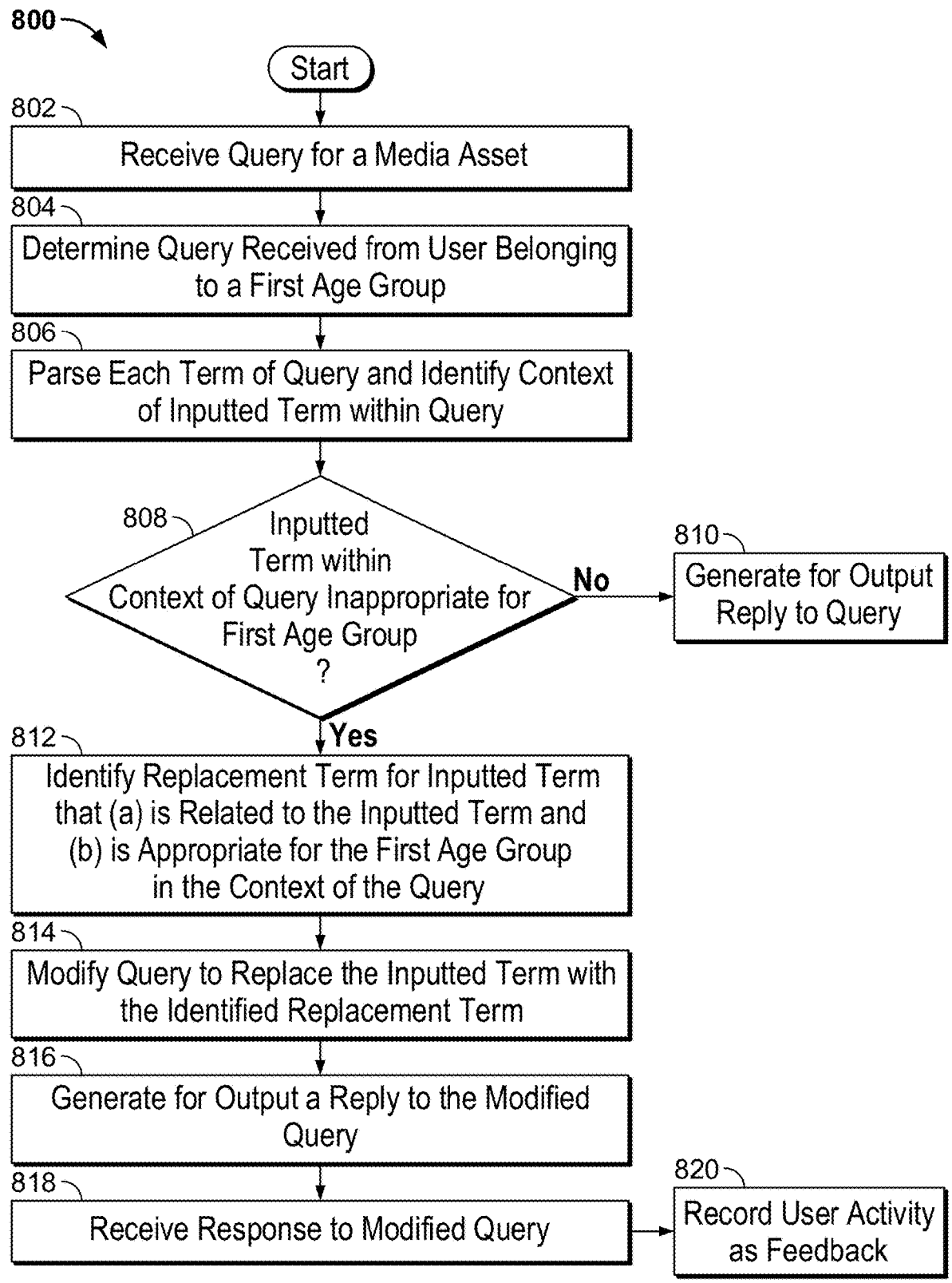
FIG. 8 is a flowchart of a detailed illustrative process for modifying a term in a query with a replacement term, in accordance with some embodiments of this disclosure.

FIG. 8 is a flowchart of a detailed illustrative process 800 for modifying a term in a query with a replacement term, in accordance with some embodiments of this disclosure. In various embodiments, the individual steps of process 800 may be implemented by one or more components of the devices and systems of FIGS. 6-7. Although the present disclosure may describe certain steps of process 800 (and of other processes described herein) as being implemented by certain components of the devices and systems of FIGS. 6-7, this is for purposes of illustration only, and it should be understood that other components of the devices and systems of FIGS. 6-7 may implement those steps instead. For example, the steps of process 800 may be executed by server 704 and/or by user equipment device 707, 708, and/or 710 to modify a term in a query with a replacement term.

At 802, input/output circuitry (e.g., I/O path 602) of a client device (e.g., user equipment device 106 of FIG. 1) may receive a query for a media asset (e.g., query 104 of FIG. 1 "Show me violent movies"). The received query may be received via any suitable input (e.g., voice input, touch input, text entry, navigating a user interface, etc.).

At 804, control circuitry (e.g., control circuitry 604 of device 600 of FIG. 6 and/or control circuitry 711 of server 704 of FIG. 7) may determine the query is received from a user (e.g., user 102 of FIG. 1) belonging to a first age group (e.g., ages 5-10). In some embodiments, the control circuitry may make such determination based on one or more of audio characteristics of the query, images detected by a sensor (e.g., image of one or more users in a vicinity of user equipment 106 of FIG. 1, based on an application being accessed, and/or based on a user profile.

At 806, the control circuitry (e.g., control circuitry 604 of device 600 of FIG. 6 and/or control circuitry 711 of server 704 of FIG. 7) may parse each term of the query using any suitable method (e.g., comparison of an identified term to a list of terms flagged as inappropriate for the identified age group and stored in a database, such as database 705 of FIG. 7, and/or using machine learning techniques). In some embodiments, the control circuitry may generate a plurality of candidate query transcriptions (e.g., based on machine learning techniques) and assign a confidence score to each candidate query.

At 808, the control circuitry (e.g., control circuitry 604 of device 600 of FIG. 6 and/or control circuitry 711 of server 704 of FIG. 7) may determine whether the inputted term, taken alone and in combination with the other words of the query, is inappropriate for a user of the identified age group (e.g., ages 5-10 years old) within the context of the query (e.g., query 104 or query 204 of FIG. 1 and FIG. 2, respectively).

At 810, if the control circuitry determines that the terms in the received query, taken alone and/or in combination and based on the context, are unlikely to lead to search results including potentially objectionable content for a user in the identified age group, media asset recommendations based on the original query may be provided to the user (e.g., user 102 of FIG. 1).

At 808, if the control circuitry determines that at least one term in the received query, taken alone and/or in combination based on context of the term within the query, is likely to lead to search results including potentially objectionable content for a user in the identified age group, processing may move to 812. In some embodiments, if a plurality of candidate queries are generated by the control circuitry, processing may proceed to 812 if a majority of the candidate queries contain one or more terms that, in the context of such candidate queries, are likely to yield objectionable content if used in a search for recommended media assets.

At 814, the control circuitry (e.g., control circuitry 604 of device 600 of FIG. 6 and/or control circuitry 711 of server 704 of FIG. 7) may modify the inputted term at issue with the identified replacement term. For example, the identified replacement term may be identified by employing one or more of a knowledge graph (e.g., knowledge graph 300 of FIG. 3 and/or knowledge graph 400 of FIG. 4) and a machine learning model (e.g., neural network 500 of FIG. 5).

At 816, the control circuitry (e.g., control circuitry 604 of device 600 of FIG. 6 and/or control circuitry 711 of server 704 of FIG. 7) may generate for output a reply to the modified query. For example, the control circuitry may perform a search (e.g., at media content source 702 of FIG. 7 and/or database 705 of FIG. 7) for recommended media assets based on the modified query, and generate for display identifiers of such media assets (e.g., media asset identifiers 134, 136, 138 of FIG. 1; media asset identifiers 234, 236, 238 of FIG. 2.

At 818, the control circuitry may receive a response to the modified query. For example, the control circuitry may receive selection of an identifier of a recommended media asset (e.g., one of identifiers 134, 136, 138 of FIG. 1) generated for display (e.g., at user equipment device 106 of FIG. 1) based on the search performed with the modified query, or may receive an indication to perform another query.

At 820, the control circuitry may record the received user activity as feedback. For example, the control circuitry may refine one or more machine learning models based on the feedback, e.g., to increment a weight associated with a replacement term if the user selected a media asset recommendation returned based on a query including the replacement term, or to decrement a weight associated with a replacement term if the user did not select a media asset recommendation returned based on a query including the replacement term, but instead performed subsequent searches, or ceased using the media application.

Figure 9:
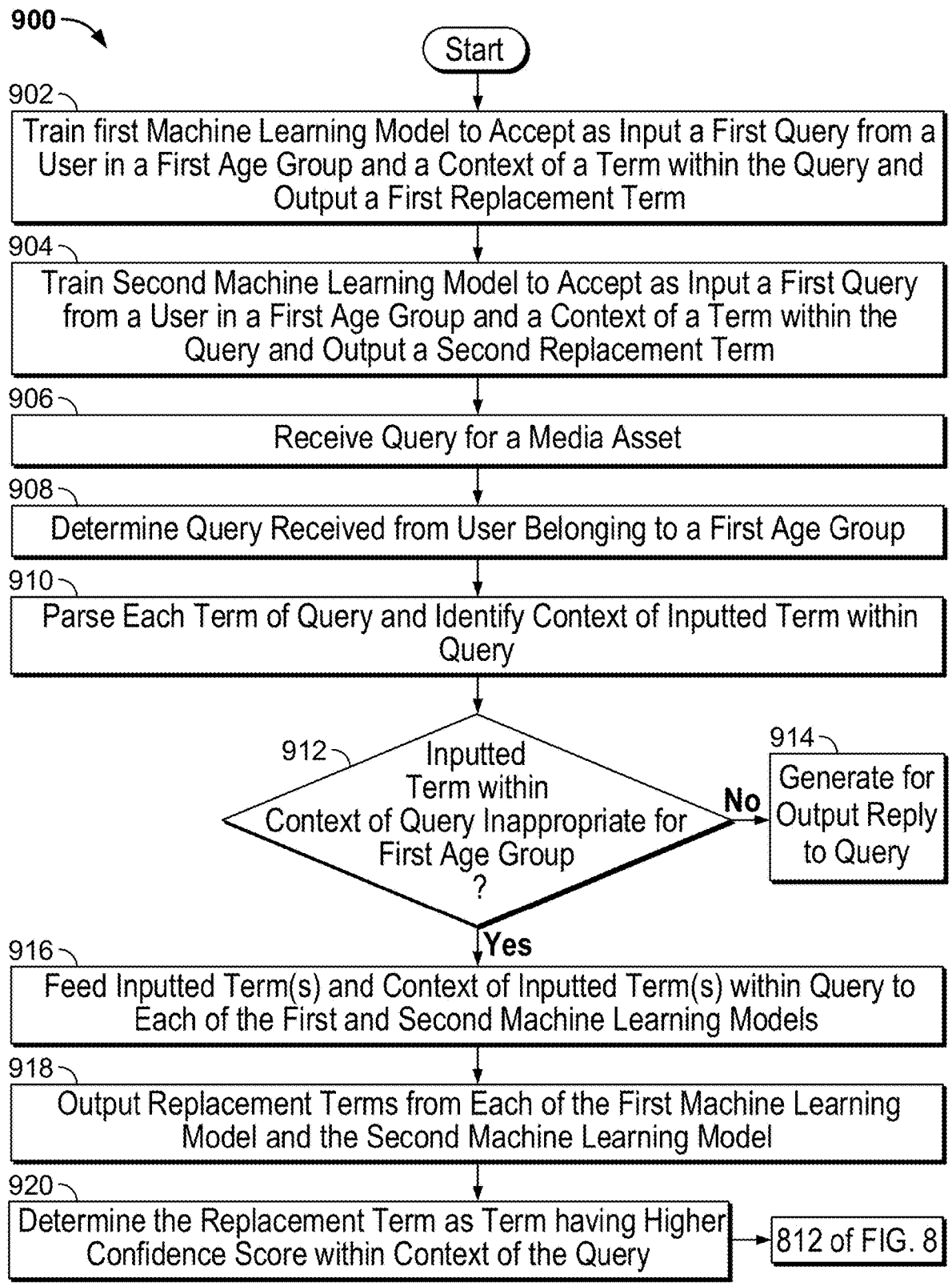
FIG. 9 is a flowchart of a detailed illustrative process for modifying a term in a query with a replacement term, in accordance with some embodiments of this disclosure.

FIG. 9 is a flowchart of a detailed illustrative process 900 for modifying a term in a query with a replacement term, in accordance with some embodiments of this disclosure. In various embodiments, the individual steps of process 900 may be implemented by one or more components of the devices and systems of FIGS. 6-7. Although the present disclosure may describe certain steps of process 900 (and of other processes described herein) as being implemented by certain components of the devices and systems of FIGS. 6-7, this is for purposes of illustration only, and it should be understood that other components of the devices and systems of FIGS. 6-7 may implement those steps instead. For example, the steps of process 900 may be executed by server 704 and/or by user equipment device 707, 708, and/or 710 to modify a term in a query with a replacement term.

At 902, the control circuitry (e.g., control circuitry 604 of device 600 of FIG. 6 and/or control circuitry 711 of server 704 of FIG. 7) may train a first machine learning model (e.g., child's intended meaning model 124 of FIG. 1) to accept as input a first query belonging to a first age group (e.g., 5-10 years old) and a context of a term (e.g., "violence" in query 104 of FIG. 1) within the query, and output a first replacement term (e.g., "action" in modified query 128 of FIG. 1). The output of the second machine learning model may be a replacement term that is semantically similar to the term at issue, accompanied by a confidence score.

At 906, the control circuitry may train a second machine learning model (e.g., phonetic similarity model 224 of FIG. 2) to accept as input the first query and output a first replacement term. The output of the second machine learning model may be a replacement term that is phonetically similar to the term at issue, accompanied by a confidence score.

Processing at steps 906-914 of FIG. 9 may be performed by the control circuitry in a similar manner as at steps 802-810 of FIG. 8, respectively.

At 916, the control circuitry (e.g., control circuitry 604 of device 600 of FIG. 6 and/or control circuitry 711 of server 704 of FIG. 7) may feed the inputted term, and the context of the inputted term within the query, into each of the trained first machine learning model and the trained second machine learning model.

At 918, each of the first machine learning model and the second machine learning model may output a respective replacement term for the term at issue. In some embodiments, the output of the first machine learning model (e.g., child's intended meaning model 124 of FIG. 1) may be a replacement term that is semantically similar to the term at issue, and the output of the first machine learning model (e.g., phonetic similarity model 224 of FIG. 2) may be a replacement term that is phonetically similar to the term at issue.

At 920, the control circuitry may determine a respective confidence score associated with each of the output replacement terms. For example, in the event the first query corresponds to, e.g., query 104 of FIG. 1, the confidence score from the first machine learning model may exceed the confidence score from the second machine learning model. Such confidence scores indicate that that "action," output from the child's intended meaning model, is a more suitable replacement term for "violence" (e.g., in that it may better preserve the user's intent) than a replacement term that is determined to be phonetically similar to "violence" (e.g., "silence").

On the other hand, in the event that the first query corresponds to, e.g., query 204 of FIG. 2, the confidence score from the second machine learning model may exceed the confidence score from the first machine learning model. Such confidence scores indicate that "a horse," output by the phonetic similarity model, is a more suitable replacement term for "wars" (e.g., in that it may better preserve the user's intent) than a replacement term that is determined to be semantically similar to "wars" (e.g., "battles"). Processing may then proceed to 812 of FIG. 8.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
    training a first machine learning model to accept as input a first query from a user belonging to a first age group and a context of a term within the first query and output a first replacement term, wherein the term within the first query is inappropriate for the first age group within the context of the first query;
    training a second machine learning model to accept as input the first query and the context of the term within the first query, and output a second replacement term;
    receiving a query for a media asset, wherein the query comprises an inputted term;
    determining that the query was received from a user belonging to the first age group;
    identifying a context of the inputted term within the query;
    determining, based on the identified context, whether the inputted term of the query is inappropriate for the first age group;
    in response to the determining that the inputted term of the query is inappropriate for the first age group:
        identifying a replacement term for the inputted term that (a) is related to the inputted term and (b) is appropriate for the first age group in the context of the query, wherein the identifying the replacement term for the inputted term comprises:
            inputting the query and the context of the inputted term within the context of the query into each of the first machine learning model and the second machine learning model to output a first replacement term semantically similar to the inputted term and a second replacement term phonetically similar to the inputted term from the first machine learning model and the second machine learning model, respectively;
            comparing a confidence score of the first replacement term to a confidence score of the second replacement term; and
            identifying the replacement term as the first replacement term or the second replacement term based on the comparing;
        modifying the query to replace the inputted term with the identified replacement term; and
        generating for output a reply to the modified query.

2. The method of claim 1, wherein the query is a voice query, the method further comprising:
    transcribing the voice query to text; wherein
    modifying the query comprises modifying the transcribed text of the query by replacing the inputted term with the replacement term.

3. The method of claim 1, wherein the first replacement term output by the first machine learning model is semantically similar to the inputted term.

4. The method of claim 1, wherein the second replacement term output by the second machine learning model is phonetically similar to the inputted term.

5. The method of claim 1, wherein determining whether the inputted term of the query is inappropriate for the first age group further comprises:
    parsing each respective term of the query and marking each respective term as either appropriate for the first age group or inappropriate for the first age group.

6. The method of claim 1, wherein determining the inputted term of the query is inappropriate for the first age group comprises:
    determining that the inputted term matches a term in a list of terms marked as inappropriate for the first age group in the identified context.

7. The method of claim 6, wherein the list of terms marked as inappropriate for the first age group in the identified context comprises a list of commonly misused terms by users in the first age group in the identified context.

8. The method of claim 6, wherein the list of terms marked as inappropriate for the first age group in the identified context comprises a list of commonly mispronounced terms by users in the first age group in the identified context.

9. A system comprising:
    input/output circuitry configured to:
        receive a query for a media asset, wherein the query comprises an inputted term; and
    control circuitry configured to:
        train a first machine learning model to accept as input a first query from a user belonging to the first age group and a context of a term within the first query and output a first replacement term, wherein the term within the first query is inappropriate for the first age group within the context of the first query;
        train a second machine learning model to accept as input the first query and the context of the term within the first query, and output a second replacement term;
        identify a context of the inputted term within the query;
        determine, based on the identified context and based on whether a reply to the query would comprise a reference to content with metadata indicating that the content is inappropriate for the first age group if the query is not modified, whether the inputted term of the query is inappropriate for the first age group;
        identify a replacement term for the inputted term by:
            inputting the query and the context of the inputted term within the context of the query into each of the first machine learning model and the second machine learning model to output a first replacement term semantically similar to the inputted term and a second replacement term phonetically similar to the inputted term from the first machine learning model and the second machine learning model, respectively;
            comparing a confidence score of the first replacement term to a confidence score of the second replacement term; and
            identifying the replacement term as the first replacement term or the second replacement term based on the comparing;
        modify the query to replace the inputted term with the identified replacement term; and
        generate for output a reply to the modified query.

10. The system of claim 9, wherein the query is a voice query, and the control circuitry is further configured to:
    transcribe the voice query to text; wherein
    modifying the query comprises modifying the transcribed text of the query by replacing the inputted term with the replacement term.

11. The system of claim 9, wherein the first replacement term output by the first machine learning model is semantically similar to the inputted term.

12. The system of claim 9, wherein the second replacement term output by the second machine learning model is phonetically similar to the inputted term.

13. The system of claim 9, wherein the control circuitry is configured to determine whether the inputted term of the query is inappropriate for the first age group by:
- parsing each respective term of the query and marking each respective term as either appropriate for the first age group or inappropriate for the first age group.

14. The system of claim 9, wherein the control circuitry is configured to determine the inputted term of the query is inappropriate for the first age group by:
- determining that the inputted term matches a term in a list of terms marked as inappropriate for the first age group in the identified context.

15. The system of claim 14, wherein the list of terms marked as inappropriate for the first age group in the identified context comprises a list of commonly misused terms by users in the first age group in the identified context.

16. The system of claim 14, wherein the list of terms marked as inappropriate for the first age group in the identified context comprises a list of commonly mispronounced terms by users in the first age group in the identified context.

\* \* \* \* \*